United States Patent
Liu et al.

(10) Patent No.: US 11,972,617 B2
(45) Date of Patent: Apr. 30, 2024

(54) HYBRID LANE MODEL

(71) Applicant: Black Sesame International Holding Limited, San Jose, CA (US)

(72) Inventors: Liying Liu, Singapore (SG); Zuoguan Wang, Los Gatos, CA (US); Qun Gu, San Jose, CA (US)

(73) Assignee: Sesame Technologies Inc., San Jose, CA (US)

( * ) Notice: Subject to any disclaimer, the term of this patent is extended or adjusted under 35 U.S.C. 154(b) by 0 days.

(21) Appl. No.: 17/349,340

(22) Filed: Jun. 16, 2021

(65) Prior Publication Data
US 2022/0405515 A1  Dec. 22, 2022

(51) Int. Cl.
G06V 10/44 (2022.01)
G06F 18/23 (2023.01)
G06V 10/30 (2022.01)
G06V 20/56 (2022.01)

(52) U.S. Cl.
CPC ........... *G06V 20/588* (2022.01); *G06F 18/23* (2023.01); *G06V 10/30* (2022.01); *G06V 10/44* (2022.01)

(58) Field of Classification Search
CPC .... G06V 20/588; G06V 10/44; G06V 10/755; G06V 40/161; G06K 9/6218; B60W 2552/53; B60W 40/072; G06T 2207/30256; G06T 17/30; G08G 1/167
See application file for complete search history.

(56) References Cited

U.S. PATENT DOCUMENTS

| | | | |
|---|---|---|---|
| 10,867,192 B1* | 12/2020 | Song | H04N 23/698 |
| 2010/0082248 A1* | 4/2010 | Dorum | G06F 16/29 |
| | | | 701/533 |
| 2016/0018229 A1* | 1/2016 | Lee | B60W 60/001 |
| | | | 701/409 |
| 2020/0317194 A1* | 10/2020 | Yan | B60W 30/143 |
| 2021/0209941 A1* | 7/2021 | Maheshwari | G06T 7/11 |

OTHER PUBLICATIONS

Sanskar Agrawal; Indu Kant Deo; Siddhant Haldar; G Rahul Kranti Kiran; Vaibhav Lodhi; Debashish Chakravarty, Off-Road Lane Detection Using Superpixel Clustering and RANSAC Curve Fitting, 2018, 10.1109/ICARCV.2018.8581155, pp. 1942-1946 (Year: 2018).*

Yue Wang; Eam Khwang Teoh; Dinggang Shen, Lane Detection Using B-Snake, 2002, 10.1109/ICIIS.1999.810313, 269-280 (Year: 2002).*

Yue Wang, Eam Khwang Teoh and Dinggang Shen, "Lane Detection Using B-Snake" (Year: 2004).*

(Continued)

*Primary Examiner* — Molly Wilburn
*Assistant Examiner* — Ahmed A Nasher
(74) *Attorney, Agent, or Firm* — Timothy T. Wang; Ni, Wang & Massand, PLLC (57) ABSTRACT

A method of hybrid lane modeling, including, receiving a roadway image, extracting a set of lane points from the roadway image, fitting a polynomial line to the set of lane points, determining a fitted error of the fitted polynomial line, outputting the polynomial line if the fitted error is less than a predetermined threshold, selecting a set of clean lane points from the set of lane points if the fitted error is greater than the predetermined threshold and interpolating a cubic spline line to the set of clean lane points.

10 Claims, 6 Drawing Sheets

(56) References Cited

OTHER PUBLICATIONS

Sanskar Agrawal Indu Kant Deo Siddhant Haldar G Rahul Kranti Kiran Vaibhav Lodhi5 Debashish Chakravarty "Off-Road Lane Detection Using Superpixel Clustering and RANSAC Curve Fitting " (Year: 2018).*

Wang, Yue & Teoh, Eam & Shen, Dinggang. (2004). Lane detection and tracking using B-Snake. Image and Vision Computing. 22. 269-280. 10.1016/j.imavis.2003.10.003.

S. Agrawal, I. K. Deo, S. Haldar, G. R. Kranti Kiran, V. Lodhi and D. Chakravarty, "Off-Road Lane Detection Using Superpixel Clustering and RANSAC Curve Fitting," 2018 15th International Conference on Control, Automation, Robotics and Vision (ICARCV), Singapore, 2018, pp. 1942-1946, doi: 10.1109/ICARCV.2018. 8581155.

C. Gackstatter, P. Heinemann, S. Thomas, G. Klinker, Stable road lane model based on clothoids. Advanced Microsystems for Automotive Applications, pp. 133-143, 2010.

Davy Neven, Bert De Brabandere, Stamatios Georgoulis, Marc Proesmans, and Luc Van Gool. Towards end-to-end lane detection: an instance segmentation approach. CoRR, 1802.05591, 2018.

Chunyang, Mu & Ma, Xing. (2014). Lane Detection Based on Object Segmentation and Piecewise Fitting. Telkomnika Indonesian Journal of Electrical Engineering. 12. 10.11591/telkomnika.v12i5. 3240.

Y. Wang, D. Shen, E.K. Teoh, Lane detection using Catmull-Rom Spline, IEEE International Conference on Intelligent Vehicles (1998) 51-57.

Z. Kim, "Robust Lane Detection and Tracking in Challenging Scenarios," in IEEE Transactions on Intelligent Transportation Systems, vol. 9, No. 1, pp. 16-26, Mar. 2008, doi: 10.1109/TITS. 2007.908582.

* cited by examiner

HYBRID LANE MODEL

BACKGROUND

Technical Field

The instant disclosure is related to lane modeling and more specifically to hybrid lane modeling.

Background

Currently, camera-based lane detection utilizes lane point extraction via computer vison or modern deep learning, lane point clustering, and lane curve fitting. Efficient lane fitting of simple lane shapes and complex lane shapes is currently problematic due to the overfitting of lane models.

SUMMARY

A method of hybrid lane modeling, including, receiving a roadway image, extracting a set of lane points from the roadway image, fitting a polynomial line to the set of lane points, determining a fitted error of the fitted polynomial line, outputting the polynomial line if the fitted error is less than a predetermined threshold, selecting a set of clean lane points from the set of lane points if the fitted error is greater than the predetermined threshold and interpolating a cubic spline line to the set of clean lane points.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
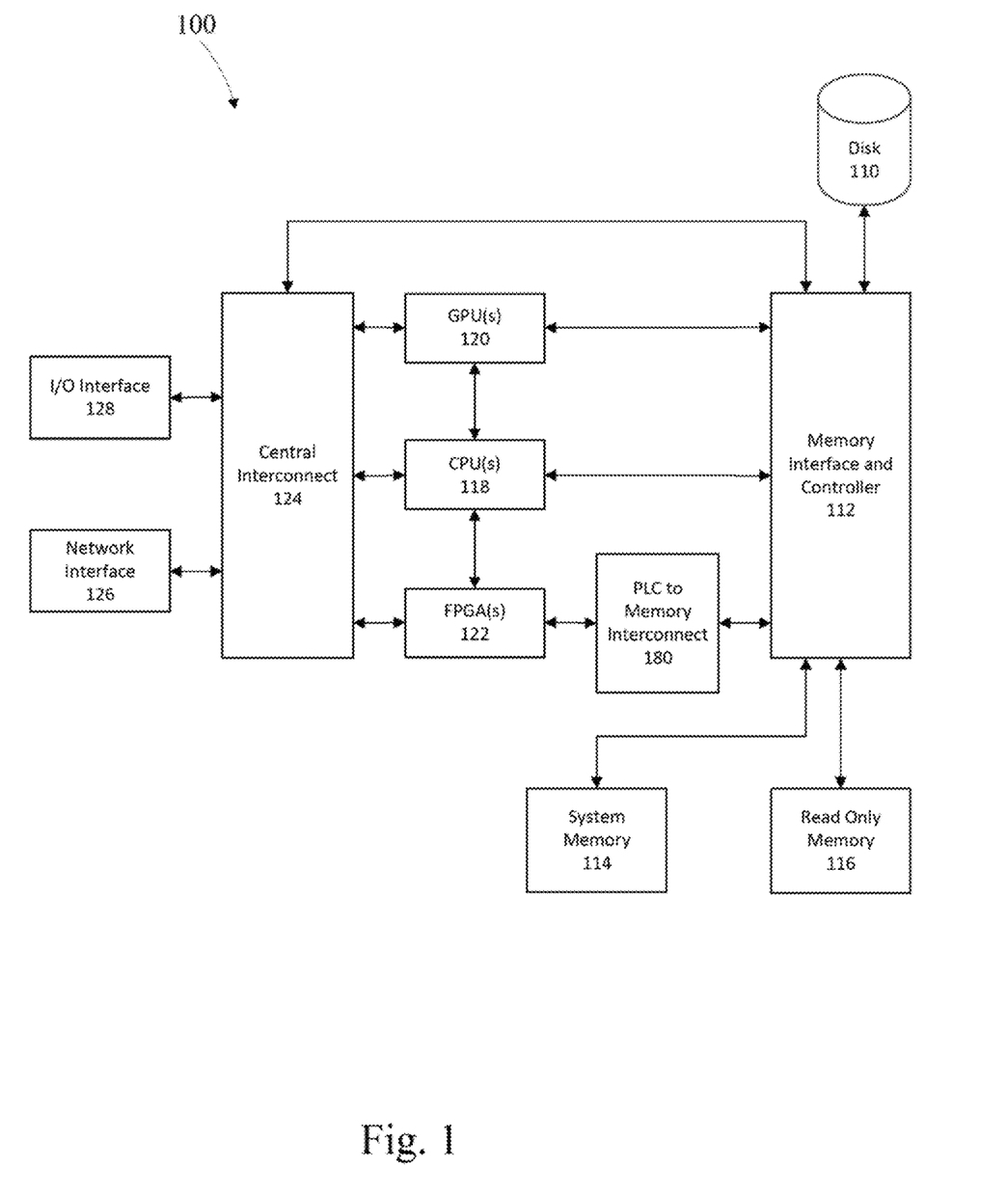
FIG. 1 is a first example system diagram in accordance with one embodiment of the disclosure.

FIG. 1 depicts an example hybrid computational system 100 that may be used to implement neural nets associated with the operation of one or more portions or steps of the processes. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions well with unstructured data and may be utilized far training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
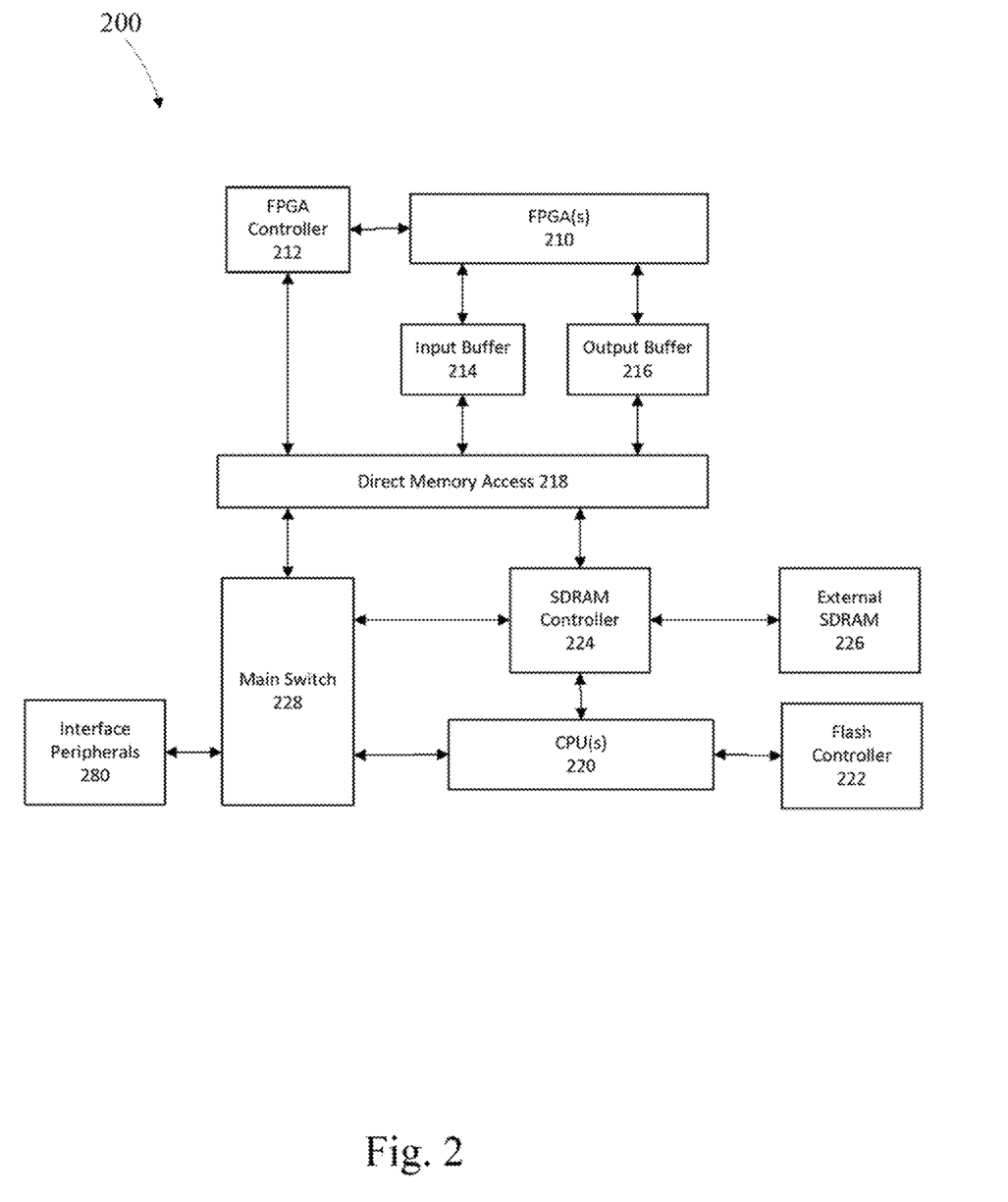
FIG. 2 is a second example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 224 and the CPU 220. The main switch 228 is connected to the peripherals interface 230. A flash controller 222 controls persistent memory and is connected to the CPU 220.

Camera-based lane detection utilizes lane point extraction via computer vison or modern deep learning, lane point clustering, and lane curve fitting. Lane fitting allows an autonomous vehicle to sense an environment and navigate within that environment. A precise curvature model allows accurate lane departure warnings and subsequent trajectory forecasting.

To remove the perspective effect inherent in street level images and increase a quality of the curve fit, lane points may be converted into a bird's-eye view based on focal length, optical center, pitch angle, yaw angle, and camera height, before fitting a lane model.

Polynomials and splines may be utilized as lane models. Polynomials accurately model straight lanes and are less sensitive to noisy lane points. Polynomials may not accurately represent complex lane shapes such as s-shape lanes, large-curvature lanes and the like, and these complex lanes may be frequently found on urban streets and highways.

Splines accurately represent complex lane shapes, but may exhibit an increased sensitivity to noisy lane points and, the determination of a spline may be more time consuming. An over fitted model is a model that corresponds too intricately to the input data and may fail to reliably predict future movements due to having extracted noise as a feature of the model. In essence, the predicted movement may be noisy and unstable. Splines may be susceptible to overfilling, especially for straight lanes, which are the most common lane structures.

In order to utilize a lane model usable for simple and complex lane shapes, a hybrid strategy may provide a solution that combines polynomial fitting and cubic spline interpolation.

One example of the proposed solution utilizes a hybrid strategy that combines polynomial fitting and cubic spline interpolation for lane model fitting. The proposed method may include three portions, a fitting of polynomial lane model, verification as to whether a fitted error is larger than a predetermined threshold and if the fitted error is less than the predetermined threshold, the fitted polynomial model may be utilized as the lane model. If the fitted error is greater than a predetermined threshold the method may interpolate a cubic spline model as the lane model.

Figure 3:
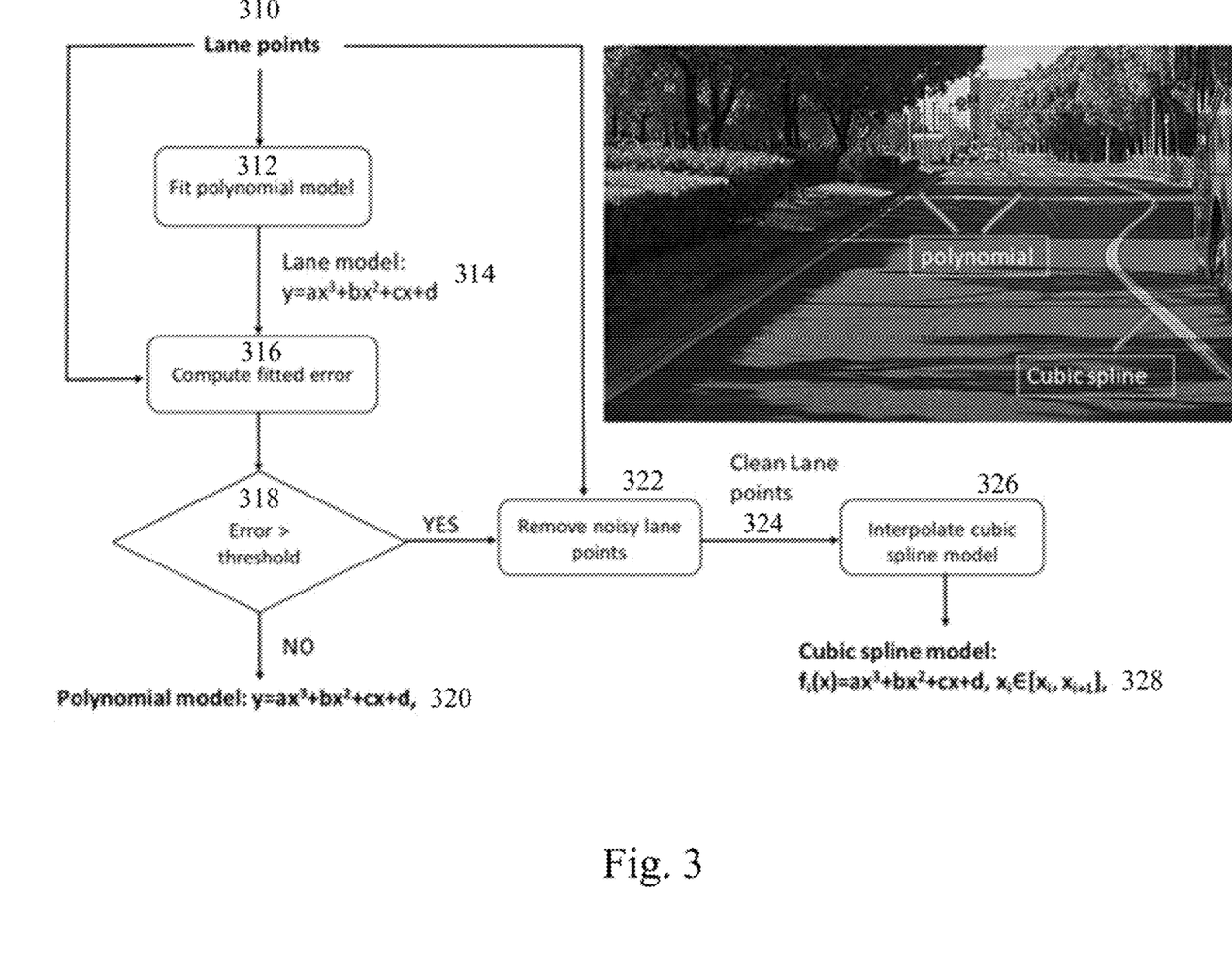
FIG. 3 is an example flow in accordance with one embodiment of the disclosure.

FIG. 3 depicts an example hybrid model. Based on an image lane points 310 are fit to the lanes, a polynomial model is fit 312 to the lane model 314 and an error is determined 316. If the error is less than a predetermined threshold, a polynomial model of the lane is output 320. If the polynomial error is greater than the predetermined threshold 318, noisy lane points are removed 322 to prevent overfilling of the model, this yields clean lane points 324 which are interpolated 326 to a cubic spline model 328.

Given a list of lane points $P=[p_1, p_2, \ldots, p_n]$, $p_i=(x_i, y_i)$, $i \in [1, n]$, a third-order polynomial may be fit $y=ax^3+bx^2+cx+d$ through these points.

$$w = [a, b, c, d]^T$$

$$Y = [y_1, y_2, \ldots, y_n]^T$$

$$X = \begin{bmatrix} x_1^3 & x_1^2 & x_1 & 1 \\ x_2^3 & x_2^2 & x_2 & 1 \\ \vdots & \vdots & \vdots & \vdots \\ x_n^3 & x_n^2 & x_n & 1 \end{bmatrix}$$

The closed-form solution of the least-square algorithm is $$w=(X^TX)^{-1}X^TY$$

After regressing the third-order polynomial $y=ax^3+bx^2+cx+d$, the fitted error may be computed using the following two formulas to determine whether such a polynomial model is sufficient to represent the lane:

$$y_i'=ax_i^3+bx_i^2+cx_i+d$$

$$\text{Error} = \frac{1}{n}\sum_{i=1}^{n}(|y_i' - y_i|)$$

Figure 4:
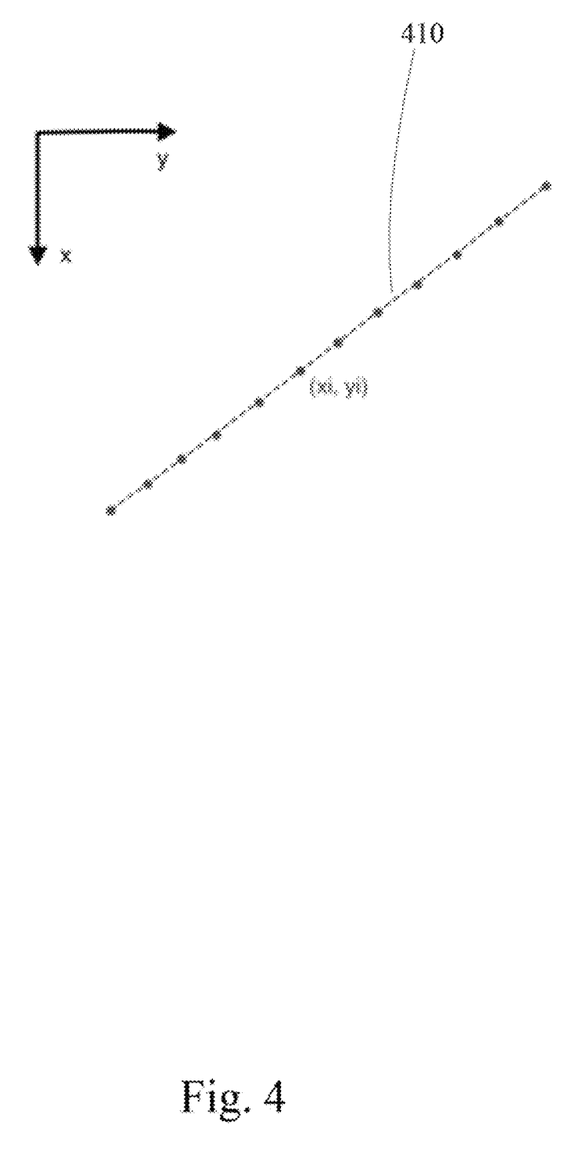
FIG. 4 is an example of a polynomial lane model in accordance with one embodiment of the disclosure.
Figure 5:
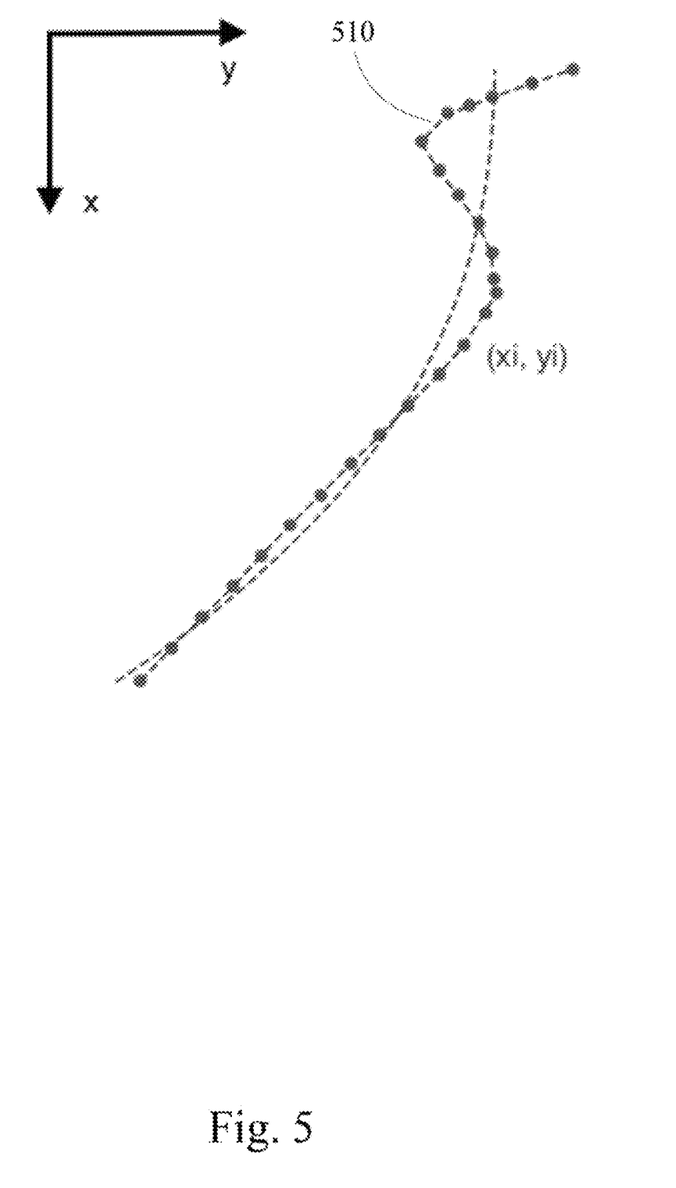
FIG. 5 is an example of a spline curve lane model in accordance with one embodiment of the disclosure.

If the fitted error is smaller than a predetermined threshold, this indicates that the lane is simple and a polynomial 410 is capable to accurately represent it, as shown in FIG. 4. If the fitted error is greater than the predetermined threshold, this lane may have a complex shape for which a polynomial representation is insufficient, and a more complex model 510 may be relied upon, as shown in FIG. 5.

Before cubic spline interpolation, noisy lane point removal may be performed, as the cubic spline model passes through the control points. Since noisy point removal may be relatively time-consuming, polynomial fitting may be performed prior to cubic spline interpolation in order to potentially save time.

A cubic spline $\varphi(x)$ is piecewise third-order polynomial, given a list of clean lane points, $P=[p_1, p_2, \ldots, p_n]$, $p_i=(x_i, y_i)$, $i \in [1, n]$:

$$\varphi(x) = \begin{cases} f_1(x), x \in [x1, x2] \\ f_2(x), x \in [x2, x3] \\ \vdots \\ f_{n-1}(x), x \in [x_{n-1}, x_n] \end{cases}$$

with $f_i(x)=a_ix^3+b_ix^2+c_ix+d_i$.

It satisfies the following conditions:

$$\varphi(x_i)=y_i$$

$$f_i(x_{i+1})=y_{i+1}$$

$$f_i'(x_i)=f_{i+1}'(x_i)$$

$$f_i''(x_i)=f_{i+1}''(x_i)$$

$$f_1''(x_1)=f_{n-1}''(x_n)=0$$

By solving the above equations, $\varphi(x)$ can be found and will yield a lane model when the polynomial fitted error is greater than the predetermined threshold.

Figure 6:
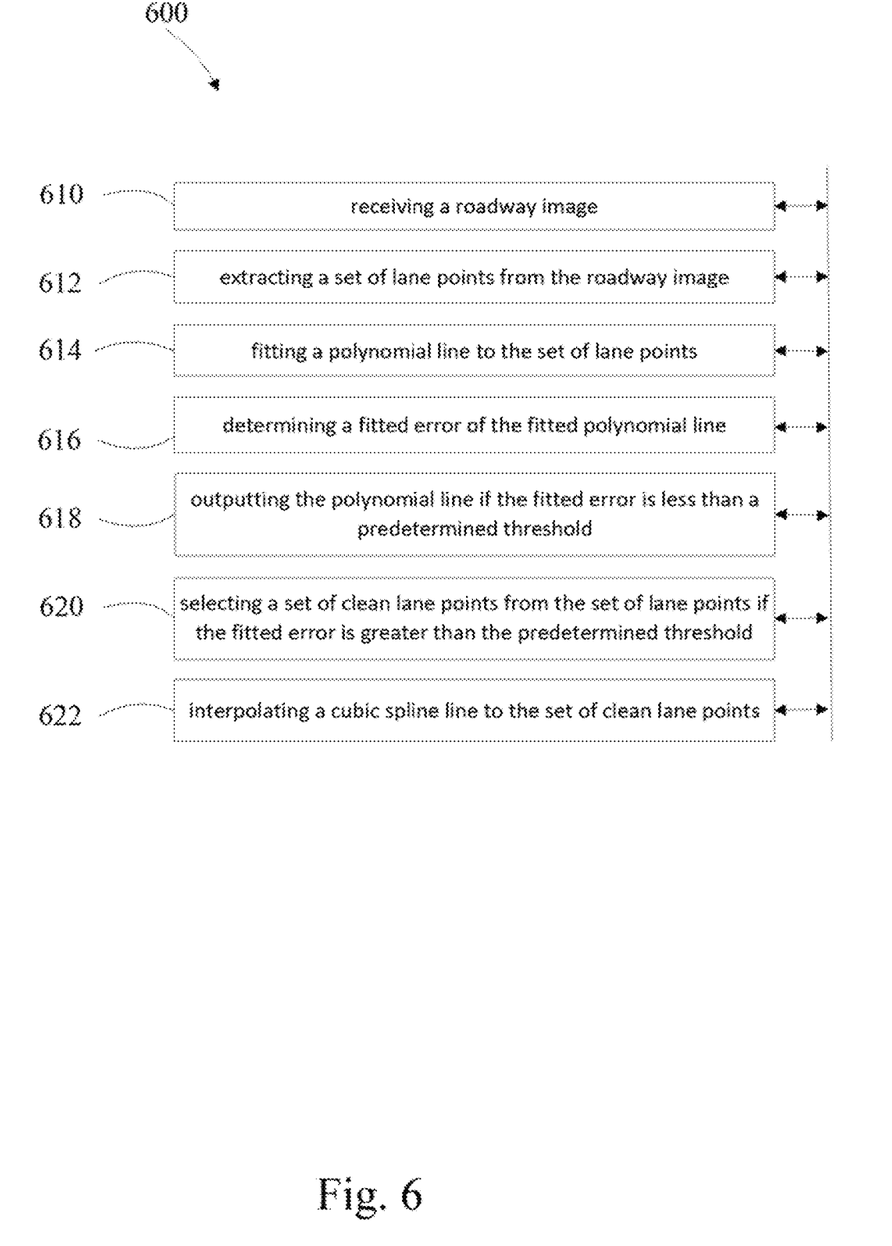
FIG. 6 is an example method of hybrid lane modeling in accordance with one embodiment of the disclosure.

FIG. 6 depicts an example method of hybrid lane modeling, including, receiving 610 a roadway image, extracting 612 a set of lane points from the roadway image and fitting 614 a polynomial line to the set of lane points. The method also includes determining 616 a fitted error of the fitted polynomial line, outputting 618 the polynomial line if the fitted error is less than a predetermined threshold, selecting 620 a set of clean lane points from the set of lane points if the fitted error is greater than the predetermined threshold and interpolating 622 a cubic spline line to the set of clean lane points.

The method may further include clustering, the extracted lane points, removing noisy lane points from the set of lane points to yield the set of clean lane points and outputting the cubic spline. The lane points may be converted to a bird's eye view that may be based on a focal length, an optical center, a pitch angle, a yaw angle and a camera height. The extraction of lane point may be at least one of equidistant in which each of the lane points is approximately the same distance apart and equitemporal in which the lane points are approximately equally spaced in time. the outputted polynomial line and or the outputted cubic spline line may be a modeled lane and a predicted movement along the outputted cubic spline line may not exceed a movement noise threshold.

The proposed solution combines polynomial fitting and cubic spline interpolation that may be able to represent simple and complex lane shapes while avoiding overfitting.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible mortification of a subject, but, rather, are intended to be used interchangeably. For example, a processor configured to monitor and control art operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

Structural and functional equivalents to the elements of the various aspects described to throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing, the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method of hybrid lane modeling, comprising:
receiving a roadway image;
extracting a set of lane points from the roadway image;
fitting a polynomial line to the set of lane points;
determining a fitted error of the fitted polynomial line;
outputting the polynomial line if the fitted error is less than a predetermined threshold wherein the predetermined threshold is a characterization of lane complexity;
selecting a set of clean lane points from the set of lane points if the fitted error is greater than the predetermined threshold;
removing noisy lane points from the set of lane points to yield the set of clean lane points; and
interpolating a cubic spline line to the set of clean lane points;
and
wherein the set of clean line points is more complex than the polynomial line.

2. The method of hybrid lane modeling of claim 1, further comprising outputting the cubic spline hoe.

3. The method of hybrid lane modeling of claim 1, wherein the set of lane points is at least one of equidistant and equitemporal.

4. The method of hybrid lane modeling of claim 1, further comprising clustering the set of lane points.

5. The method hybrid lane modeling of claim 1, further comprising converting the set of lane pouts to a bird's eye view.

6. The method of hybrid lane modeling of claim 5, wherein the bird's eye view is based on a focal length, an optical center, a pitch angle, a yaw angle and a camera height.

7. The method of hybrid lane modeling of claim 1, wherein the outputted polynomial line is a modeled lane.

8. The method of hybrid lane modeling of claim 1, wherein the interpolated cubic spline line is a modeled lane.

9. The method of hybrid lane modeling of claim 1, wherein a predicted movement along the interpolated cubic spline line does not exceed a movement noise threshold.

10. The method of hybrid lane modeling of claim 1, wherein the fitted error is computed using the following two formulas:

$$y'_i = ax_i^3 + bx_i^2 + cx_i + d \text{ and Error} = 1/n\Sigma_{i=1}^{n}(|y'_i - y_i|).$$

\* \* \* \* \*